United States Patent
Nathan

Patent Number: 5,848,292
Date of Patent: Dec. 8, 1998

[54] SYSTEM FOR DATA TRANSMISSION BETWEEN A WEDGE MICROCONTROLLER AND A PERSONAL COMPUTER MICROCONTROLLER BY DISCONNECTING THE KEYBOARD MICROCONTROLLER AND PLACING THE SAME IN HOLD STATE

[75] Inventor: Robert H. Nathan, Atlanta, Ga.

[73] Assignee: NCR Corporation, Dayton, Ohio

[21] Appl. No.: 666,163

[22] Filed: Jun. 19, 1996

[51] Int. Cl.⁶ ..................................................... G06F 13/00
[52] U.S. Cl. ......................... 395/822; 395/858; 395/860; 395/871; 395/893
[58] Field of Search ..................................... 395/728, 821, 395/822, 858, 860, 871, 893; 400/472

[56] References Cited

U.S. PATENT DOCUMENTS

| | | | |
|---|---|---|---|
| 4,799,144 | 1/1989 | Parruck et al. | 395/822 |
| 5,101,481 | 3/1992 | Anger et al. | 395/309 |
| 5,179,375 | 1/1993 | Dick et al. | 340/825.51 |
| 5,220,522 | 6/1993 | Wilson et al. | 364/709.04 |
| 5,258,604 | 11/1993 | Behrens et al. | 235/462 |
| 5,263,171 | 11/1993 | Asprey | 395/728 |
| 5,438,186 | 8/1995 | Nair et al. | 235/449 |
| 5,667,319 | 9/1997 | Satloff | 400/472 |

*Primary Examiner*—Thomas C. Lee
*Assistant Examiner*—Ki S. Kim
*Attorney, Agent, or Firm*—James P. Davidson; Peter H. Priest

[57] ABSTRACT

A system for interfacing at least one peripheral device with a personal computer is disclosed as including a personal computer microcontroller, a keyboard microcontroller directly connected to the personal computer microcontroller by means of a clock line and a data line, a switching device positioned between the personal computer microcontroller and the keyboard microcontroller, and a wedge microcontroller to which the peripheral device may be connected. The wedge microcontroller further includes a first set of connections to the clock and data lines positioned between the switching device and the keyboard microcontroller, a second set of connections to the clock and data lines positioned between the switching device and the personal computer microcontroller, and a switch control connection to the switching device for opening and closing the switching device. The direct connection between the personal computer microcontroller and the keyboard microcontroller can be disabled by opening the switching device so that the wedge microcontroller may input data from the peripheral device into the personal computer microcontroller.

17 Claims, 3 Drawing Sheets

SYSTEM FOR DATA TRANSMISSION BETWEEN A WEDGE MICROCONTROLLER AND A PERSONAL COMPUTER MICROCONTROLLER BY DISCONNECTING THE KEYBOARD MICROCONTROLLER AND PLACING THE SAME IN HOLD STATE

BACKGROUND OF THE INVENTION

1. Field of the Invention

The present invention relates generally to wedge interfaces which enable peripheral devices to communicate with a personal computer and, in particular, to a manner of connecting a wedge interface to a personal computer which permits a direct connection between the personal computer and a keyboard.

2. Description of Related Art

It is well known that the standard interface between a personal computer and a keyboard is based on a design which incorporates an electronic circuit having four wires (CLOCK, DATA, +5 volts, and Ground). These four wires are utilized to connect a microcontroller in the keyboard to a microcontroller in the personal computer (or equivalent circuitry). Of course, the transfer of data depends on a well defined signaling convention between the two microcontrollers.

Various peripheral devices have been developed which are inserted or "wedged" in the circuit between the keyboard and personal computer. Examples of such peripheral or wedge devices include magnetic stripe readers, bar code readers, laser guns, and optical character readers. These devices are currently inserted so as to permanently split the connection between the keyboard microcontroller and the personal computer microcontroller by inserting a wedge microcontroller therebetween. An example of such a design is disclosed in U.S. Pat. No. 5,179,375 to Dick et al. The wedge microcontroller connected in this manner therefore serves as a store-and-forward switch, presenting an interface to the keyboard which looks (to the keyboard) like a host personal computer and an interface to the personal computer which looks (to the personal computer) like a keyboard. Accordingly, the keyboard's microcontroller delivers data to the wedge microcontroller when the keyboard has data to send to the personal computer, after which the wedge microcontroller transfers that data to the personal computer microcontroller. When the wedge microcontroller has data to send to the personal computer from a peripheral device, it is able to do so at will.

However, the above-described design has several detriments associated therewith. For example, timing problems occur periodically because the personal computer communicates only indirectly with the keyboard. Additionally, the wedge microcontroller incurs the overhead of becoming a full store-and-forward keystroke message controller, which adds significant initial development time to the wedge microcontroller and exposes the wedge microcontroller to future modifications in keyboard communications stemming from keyboard functionality.

In light of the foregoing, a primary objective of the present invention is to provide a system for interfacing at least one peripheral device with a personal computer which permits direct connection between the microcontroller of the personal computer and the microcontroller of a keyboard.

Another object of the present invention is to provide a system for interfacing at least one peripheral device with a personal computer which minimizes interruption of a direct connection between the personal computer microcontroller and the keyboard microcontroller.

A further object of the present invention is to provide a system for interfacing at least one peripheral device with a personal computer which enables data to be transmitted to the personal computer microcontroller from only one source.

Yet another object of the present invention is to provide a system for interfacing at least one peripheral device with a personal computer in which a microcontroller of the personal computer perceives a wedge microcontroller as a keyboard microcontroller and the keyboard microcontroller perceives the wedge microcontroller as the personal computer microcontroller.

Still another object of the present invention is to provide a system for interfacing at least one peripheral device with a personal computer in which the direct connection between the personal computer microcontroller and the keyboard microcontroller can be dynamically disconnected and reconnected.

Another object of the present invention is to provide a method of periodically connecting a wedge microcontroller to a personal computer microcontroller for data transmission, where the personal computer microcontroller is otherwise directly connected to a keyboard microcontroller.

A still further object of the present invention is to provide a method of transmitting data from a wedge microcontroller to a personal computer microcontroller, where the personal computer microcontroller is directly connected to a keyboard microcontroller.

These objects and other features of the present invention will become more readily apparent upon reference to the following description when taken in conjunction with following drawing.

SUMMARY OF THE INVENTION

In accordance with one aspect of the present invention, a system for interfacing at least one peripheral device with a personal computer is disclosed as including a personal computer microcontroller, a keyboard microcontroller directly connected to the personal computer microcontroller by means of a clock line and a data line, a switching device positioned between the personal computer microcontroller and the keyboard microcontroller, and a wedge microcontroller to which the peripheral device may be connected. The wedge microcontroller further includes a first set of connections to the clock and data lines positioned between the switching device and the keyboard microcontroller, a second set of connections to the clock and data lines positioned between the switching device and the personal computer microcontroller, and a switch control connection to the switching device for opening and closing the switching device. In this way, the direct connection between the personal computer microcontroller and the keyboard microcontroller can be disabled by opening the switching device so that the wedge microcontroller may input data from the peripheral device into the personal computer microcontroller.

In accordance with a second aspect of the present invention, a method of periodically connecting a wedge microcontroller to a personal computer microcontroller for data transmission is disclosed, wherein the personal computer microcontroller is directly connected to a keyboard microcontroller by means of a clock line and a data line. The method includes the steps of: providing a switching device in the clock and data lines between the personal computer microcontroller and the keyboard microcontroller; providing the wedge microcontroller with a first set of connections to the clock and data lines at a location between the switching device and the keyboard microcontroller; providing the wedge microcontroller with a second set of connections to the clock and data lines at a location between the switching device and the personal computer microcontroller; and, permitting the wedge microcontroller to control the opening and closing of the switching device so that the direct connection between the keyboard microcontroller and the personal computer microcontroller may be disabled when the wedge microcontroller has data to be transmitted to the personal computer microcontroller.

In accordance with a third aspect of the present invention, a method of transmitting data from a wedge microcontroller to a personal computer microcontroller is disclosed, wherein the personal computer microcontroller is directly connected to a keyboard microcontroller by means of a clock line and a data line with a switching device positioned therebetween. The wedge microcontroller includes a first set of connections to the clock and data lines between the switching device and the keyboard microcontroller and a second set of connections to the clock and data lines between the switching device and the personal computer microcontroller. The method includes the steps of: determining whether the wedge microcontroller has data to be transmitted to the personal computer microcontroller; monitoring the data line between the keyboard microcontroller and the personal computer microcontroller, opening the switching device when no activity is detected on the clock line or the data line; and, transmitting data from the wedge microcontroller to the personal computer microcontroller.

BRIEF DESCRIPTION OF THE DRAWING

While the specification concludes with claims particularly pointing out and distinctly claiming the present invention, it is believed the same will be better understood from the following description taken in conjunction with the accompanying drawing in which:

DETAILED DESCRIPTION OF THE INVENTION

Figure 1:
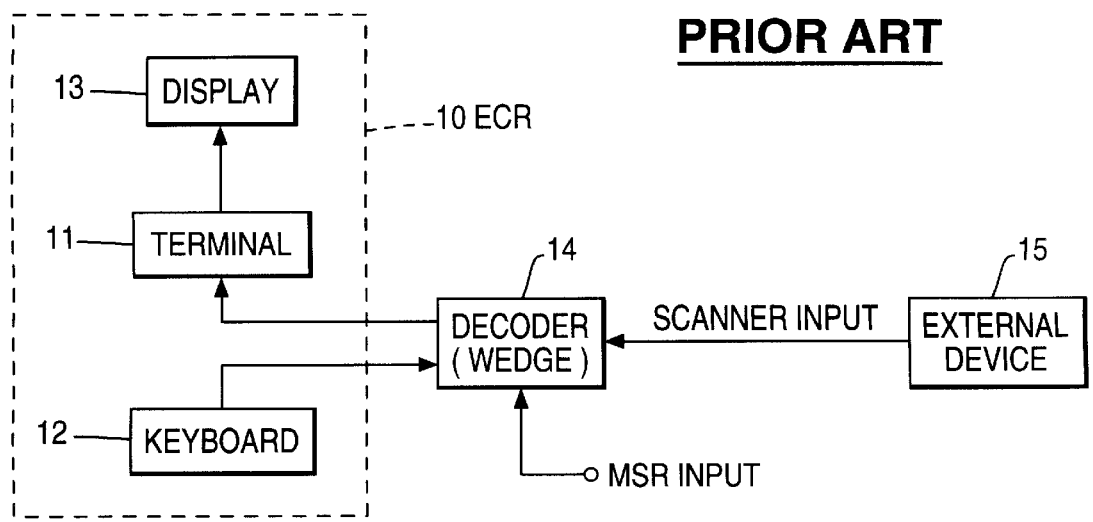
FIG. 1 is a schematic diagram of a prior art system interfacing a peripheral device with a personal computer and its keyboard.
Figure 2:
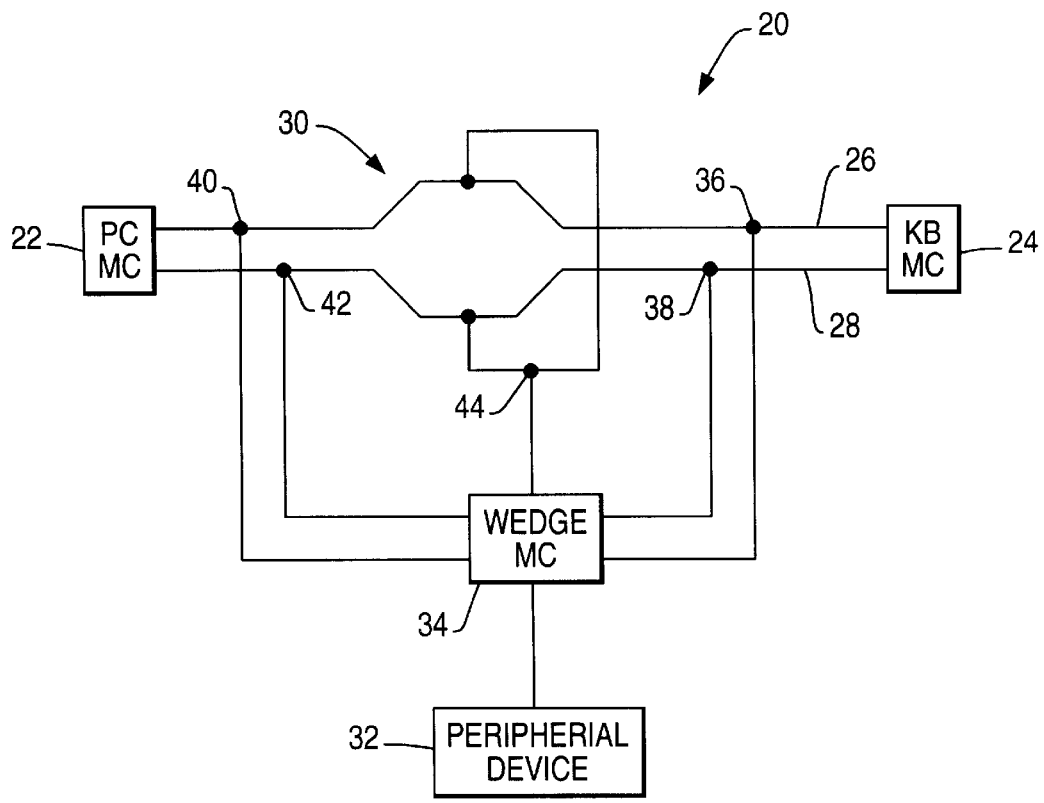
FIG. 2 is a schematic diagram of a system interfacing a peripheral device with a personal computer and its keyboard in accordance with the present invention.

Referring now to the drawing in detail, wherein identical numerals indicate the same elements throughout the figures, FIG. 1 depicts an electronic cash register system having peripherals interfaced therewith as disclosed in U.S. Pat. No. 5,179,375. As seen therein, the keyboard 12 of electronic cash register 10 transmits signals indirectly to terminal 11 via a decoder (wedge) 14. An external device 15 also is connected to decoder (wedge) 14 so that decoder (wedge) 14 must determine which signal to send to terminal 11 of electronic cash register 10.

Contrary to the system depicted in FIG. 1, the present invention involves a system, designated generally by the numeral 20, in which a personal computer 22 (or more specifically the microcontroller thereof) is directly connected to a keyboard 24 (or more specifically the microcontroller thereof). In particular, personal computer microcontroller 22 is connected directly to keyboard microcontroller 24 by means of a standard interface in which only a clock line 26 and a data line 28 are shown.

A switching device 30 is provided between personal computer microcontroller 22 and keyboard microcontroller 24 on both clock and data lines 26 and 28, respectively. Thus, while switching device 30 will normally be in the closed position, whereby data may be transmitted directly from keyboard microcontroller 24 to personal computer microcontroller 22, this connection may be electrically disabled by opening switching device 30. It should be noted that a preferred embodiment for switching device 30 is a double-pole, single throw (DPST) silicon switch, consisting of two pairs of matching transistors.

In order that at least one peripheral device 32 may transmit data to personal computer microcontroller 22, a wedge microcontroller 34 is provided in system 20. While the present invention is not limited by the use of a particular wedge microcontroller, an exemplary wedge microcontroller is the "Wedge Dynakey Control Board" sold by NCR Corp. in Dayton, Ohio. It will be seen that wedge microcontroller 34 has a first set of connections 36 and 38 to clock and data lines 26 and 28, respectively, which are positioned between switching device 30 and keyboard microcontroller 24. Likewise, wedge microcontroller 34 has a second set of connections 40 and 42 to clock and data lines 26 and 28, respectively, which are positioned between switching device 30 and personal computer microcontroller 22. A switch control connection 44 is also provided between wedge microcontroller 34 and switching device 30 so that wedge microcontroller 34 is able to control the opening and closing of switching device 30 and therefore whether personal computer microcontroller 22 and keyboard microcontroller 24 remain connected. In this way, wedge microcontroller 34 periodically enables data to be transmitted from peripheral device 32 to personal computer microcontroller 22.

It is preferred that switching device 30 be biased closed to maintain the direct connection between keyboard microcontroller 24 and personal computer microcontroller 22. Accordingly, system 20 is designed so that switching device 30 will be closed upon powering up. In order for the direct connection between keyboard microcontroller 24 and personal computer microcontroller 22 to be disabled, affirmative action must be taken by wedge microcontroller 34 to open switching device 30. This action involves the transmission of a signal from wedge microcontroller 34 to switching device 30 via switch signal connection 44.

Before wedge mechanism 34 transmits a signal to open switching device 30, however, wedge mechanism 34 must determine first whether peripheral device 32 has data to be sent to personal computer microcontroller 22. If so, wedge microcontroller must also determine whether there is any activity on data line 28 between keyboard microcontroller 24 and personal computer microcontroller, which is accomplished by monitoring data line 28 through connection 38. This is due to the preference of having personal computer microcontroller 22 receive data from only one source at a given time. Provided there is no activity on data line 28 (i.e., it is at an idle state), then wedge microcontroller 34 signals switching device 30 to open and disable the direct electrical connection between personal computer microcontroller 22 and keyboard microcontroller 24.

Once switching device 30 is opened, wedge microcontroller 34 is connected to personal computer microcontroller 22 in a manner which looks (to personal computer microcontroller 22) like keyboard microcontroller 24. Likewise, wedge microcontroller 34 is connected to keyboard microcontroller 24 in a manner which looks (to keyboard microcontroller 24) like personal computer microcontroller 22. At this point, wedge microcontroller 34 is free to transmit data to personal computer microcontroller 22 from peripheral device 32. In fact, it is preferred that the opening of switching device 30 and transmission of data from wedge microcontroller 34 to personal computer microcontroller 22 occur substantially simultaneously in order to maintain the aforementioned appearances of wedge microcontroller 34 to keyboard microcontroller 24 and personal computer microcontroller 22.

In order to prevent keyboard microcontroller 24 from attempting to transmit data to personal computer microcontroller 22 while data is being transmitted from wedge microcontroller 34 thereto, wedge microcontroller 34 sends a signal to clock line 26 via connection 36 which puts clock line 26 in a low condition. This, in turn, places keyboard microcontroller 24 in a hold state. During this hold state, keyboard microcontroller 24 preferably stores data inputted therein in a buffer for later transmission to personal computer microcontroller 22. It is also preferred that the opening of switching device 30 (and therefore the electrical disabling of the connection between personal computer microcontroller 22 and keyboard microcontroller 24) and the preventing of data from being transmitted by keyboard microcontroller 24 (by placing it in a hold state) occur substantially simultaneously.

After wedge microcontroller 34 has completed the transmission of data from peripheral device 32 to personal computer microcontroller 22, wedge microcontroller 34 sends a signal to switching device 30 via switch control connection 44 which closes switching device 30 and reconnects personal computer microcontroller 22 and keyboard microcontroller 24. Upon closing of switching device 30, keyboard microcontroller 24 is released from its hold state by wedge microcontroller 34 so that it is able to transmit data (including that stored in a buffer during data transmission by wedge microcontroller 34) to personal computer microcontroller 22.

It will therefore be understood from the above description that personal computer microcontroller 22 will remain directly connected to keyboard microcontroller 24 unless switching device 30 is opened. Also, when switching device 30 is in the closed position, personal computer microcontroller 22 and keyboard microcontroller 24 will function without regard to wedge microcontroller 34. This type of connection between personal computer microcontroller 22, keyboard microcontroller 24, and wedge microcontroller 34, in which switching device 30 is able to dynamically disconnect and reconnect personal computer microcontroller 22 and keyboard microcontroller 24, minimizes the amount of interference between personal computer microcontroller 22 and keyboard microcontroller 24 (and therefore timing problems therebetween). It also limits the amount of exposure wedge microcontroller 34 has with respect to modifications in keyboard communications since relatively little keyboard functionality is required within wedge microcontroller 34.

Figure 3A:
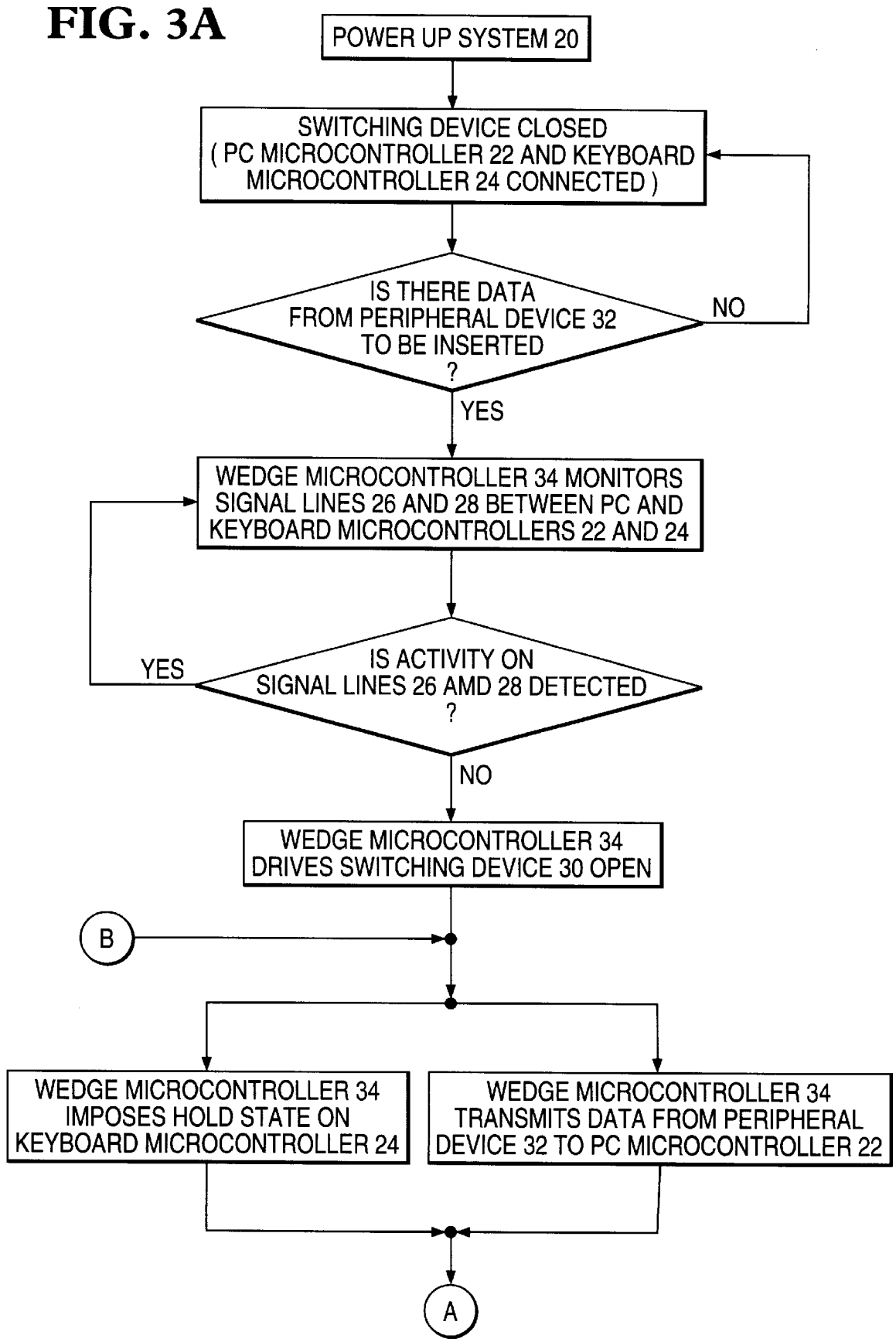
FIGS. 3A and 3B are a flow diagram depicting the process of transmitting data from the peripheral device shown in FIG. 2 to the personal computer.
Figure 3B:
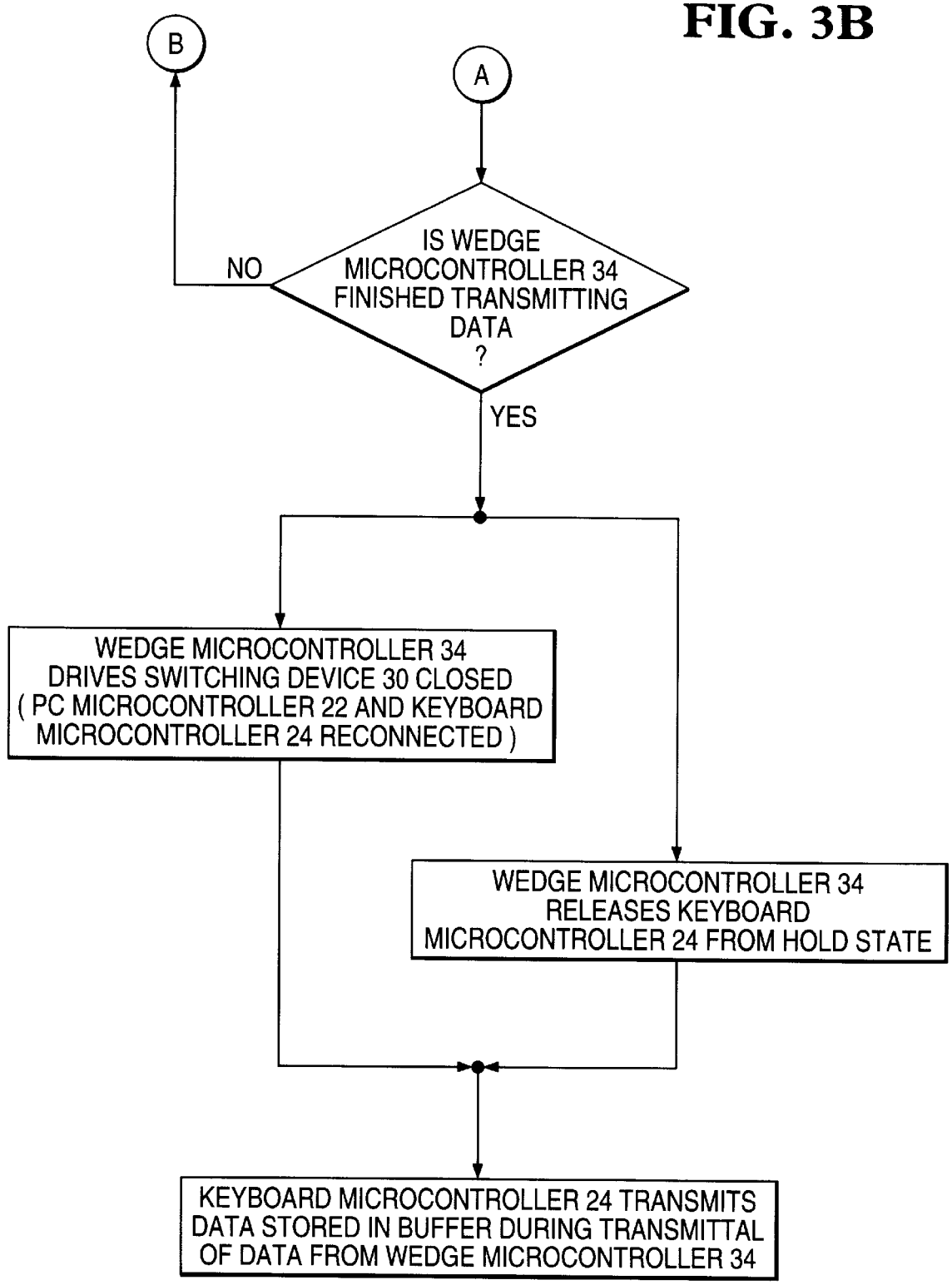

Further, as shown in the flow diagram of FIG. 3, system 20 operates in accordance with a specified process before wedge microcontroller 34 transmits data of peripheral device 32 to personal computer microcontroller 22. This process includes the steps of determining whether there is data to be transmitted to personal computer microcontroller 22 from wedge microcontroller 34, monitoring data line 28 between keyboard microcontroller 24 and personal computer microcontroller 22, opening switching device 30 when no activity is detected on data line 28, and transmitting data from wedge microcontroller 34 to personal computer microcontroller 22.

Having shown and described the preferred embodiment of the present invention, further adaptations of the above-described system for interfacing at least one peripheral device with a personal computer, as well as the wedge microcontroller utilized therefor, can be accomplished by appropriate modifications by one of ordinary skill in the art without departing from the scope of the invention which includes the claimed methods.

What is claimed is:

1. A system for interfacing at least one peripheral device with a personal computer microcontroller, comprising:
    (a) a personal computer microcontroller;
    (b) a keyboard microcontroller directly connected to said personal computer microcontroller by means of a clock line and a data line;
    (c) a switching device positioned between said personal computer microcontroller and said keyboard microcontroller; and
    (d) a wedge microcontroller to which said peripheral device is connected, comprising:
        (1) a first set of connections to said clock and data lines positioned between said switching device and said keyboard microcontroller;
        (2) a second set of connections to said clock and data lines positioned between said switching device and said personal computer microcontroller; and
        (3) a switching device control connection to said switching device for opening and closing said switching device;
    wherein the direct connection between said personal computer microcontroller and said keyboard microcontroller is disconnected by opening said switching device so that said wedge microcontroller is able to transmit data to said personal computer microcontroller;
    wherein said keyboard microcontroller is actively prevented from transmitting data to said personal computer microcontroller during transmission of data from said wedge microcontroller to said personal computer microcontroller, by said wedge microcontroller sending a signal to said keyboard microcontroller via said clock line that places said keyboard microcontroller in a hold state, for as long as the wedge microcontroller is transmitting data to said personal computer microcontroller.

2. The system of claim 1, wherein data inputted to said keyboard microcontroller is stored during said hold state.

3. The system of claim 1, wherein said wedge microcontroller sends a signal via said switch control connection to open said switching device when said wedge microcontroller has data to be transmitted to said personal computer microcontroller.

4. The system of claim 1, wherein said wedge microcontroller monitors said clock and data lines to determine whether data is being transmitted from said keyboard microcontroller to said personal computer microcontroller without affecting the direct connection between said keyboard and personal computer microcontrollers.

5. The system of claim 1, wherein opening of said switching device and preventing said keyboard microcontroller from transmitting data to said personal computer microcontroller occur substantially simultaneously.

6. The system of claim 1, wherein said personal computer microcontroller and said keyboard microcontroller function without regard to said wedge microcontroller when said switching device is closed.

7. The system of claim 1, wherein said personal computer microcontroller and said keyboard microcontroller remain directly connected unless said switching device is opened.

8. The system of claim 1, wherein said switching device is utilized to dynamically disconnect and reconnect said personal computer microcontroller and said keyboard microcontroller.

9. The system of claim 4, wherein said wedge microcontroller sends a signal via said switch control connection to open said switching device when said clock and data lines between said keyboard microcontroller and said personal computer microcontroller are determined to be idle.

10. The system of claim 3, wherein said wedge microcontroller sends a signal via said switch control connection to close said switching device upon completion of data transmission from said wedge microcontroller to said personal computer microcontroller so that said keyboard microcontroller and said personal computer microcontroller are reconnected.

11. The system of claim 3, wherein opening of said switching device and transmission of data from said wedge microcontroller to said personal computer microcontroller occur substantially simultaneously.

12. A method of periodically connecting a wedge microcontroller to a personal computer microcontroller for data transmission, wherein said personal computer microcontroller is directly connected to a keyboard microcontroller by means of a clock line and a data line, said method comprising the following steps:

(a) providing a switching device in the clock and data lines connecting said personal computer microcontroller and said keyboard microcontroller;

(b) providing said wedge microcontroller with a first set of connections to said clock and data lines at a location between said switching device and said keyboard microcontroller;

(c) providing said wedge microcontroller with a second set of connections to said clock and data lines at a location between said switching device and said personal computer microcontroller;

(d) permitting said wedge microcontroller to control the opening and closing of said switching device so that said direct connection between said keyboard microcontroller and said personal computer microcontroller may be disabled when said wedge microcontroller has data to be transmitted to said personal computer microcontroller; and (e) actively preventing said keyboard microcontroller from transmitting data to said personal computer microcontroller during transmission of data from said wedge microcontroller to said personal computer microcontroller, by said wedge microcontroller sending a signal to said keyboard microcontroller via said clock line that places said keyboard microcontroller in a hold state, for as long as the wedge microcontroller is transmitting data to said personal computer microcontroller.

13. A method of transmitting data from a wedge microcontroller to a personal computer microcontroller, wherein said personal computer microcontroller is directly connected to a keyboard microcontroller by means of a clock line and a data line with a switching device positioned therebetween, said wedge microcontroller including a first set of connections to said clock and data lines between said switching device and said keyboard microcontroller and a second set of connections to said clock and data lines between said switching device and said personal computer microcontroller, said method comprising the steps of:

(a) determining whether said wedge microcontroller has data to be transmitted to said personal computer microcontroller;

(b) monitoring said data line between said keyboard microcontroller and said personal computer microcontroller;

(c) opening said switching device when no activity is detected on said data line;

(d) transmitting data from said wedge microcontroller to said wedge microcontroller to said personal computer microcontroller; and (e) actively preventing said keyboard microcontroller from transmitting data to said personal computer microcontroller during transmission of data from said wedge microcontroller to said personal computer microcontroller, by said wedge microcontroller sending a signal to said keyboard microcontroller via said clock line that places said keyboard microcontroller in a hold state, for as long as the wedge microcontroller is transmitting data to said personal computer microcontroller.

14. The method of claim 13, wherein opening of said switching device and transmission of data from said wedge microcontroller to said personal computer microcontroller occur substantially simultaneously.

15. The method of claim 13, further comprising the step of closing said switching device when said wedge microcontroller has completed transmission of data to said personal computer microcontroller.

16. The method of claim 13, further comprising the step of storing data inputted to said keyboard microcontroller when said switching device is open.

17. The method of claim 16, further comprising the step of transmitting said stored data from said keyboard microcontroller directly to said personal computer microcontroller after said switching device is reclosed.

* * * * *